US012566474B2

(12) United States Patent
Gu et al.

(10) Patent No.: US 12,566,474 B2
(45) Date of Patent: Mar. 3, 2026

(54) ELECTRONIC DEVICE WITH SLIDABLE FLEXIBLE DISPLAY

(71) Applicant: VIVO MOBILE COMMUNICATION CO., LTD., Guangdong (CN)

(72) Inventors: Xiang Gu, Guangdong (CN); Liang Zou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 342 days.

(21) Appl. No.: 18/302,974

(22) Filed: Apr. 19, 2023

(65) Prior Publication Data

US 2023/0259168 A1    Aug. 17, 2023

Related U.S. Application Data

(63) Continuation of application No. PCT/CN2021/125986, filed on Oct. 25, 2021.

(30) Foreign Application Priority Data

Oct. 30, 2020    (CN) .......................... 202011191307.6

(51) Int. Cl.
G06F 1/16 (2006.01)

(52) U.S. Cl.
CPC .......... G06F 1/1652 (2013.01); G06F 1/1624 (2013.01); G06F 1/1686 (2013.01)

(58) Field of Classification Search
CPC .... G06F 1/1652; G06F 1/1624; G06F 1/1686; G06F 1/1677; H04M 1/0235; H04M 1/0268; H05K 5/0017; H05K 5/0217; G09F 9/301
See application file for complete search history.

(56) References Cited

U.S. PATENT DOCUMENTS

| | | | | | |
|---|---|---|---|---|---|
| 9,536,456 | B2 * | 1/2017 | Kang | .................. | H04M 1/0268 |
| 10,542,128 | B2 * | 1/2020 | Kang | ...................... | H04M 1/02 |
| 11,106,242 | B2 * | 8/2021 | Delaporte | ............ | G06F 1/1616 |
| 11,343,361 | B2 * | 5/2022 | He | ...................... | H04M 1/0237 |
| 11,775,016 | B2 * | 10/2023 | Choi | .................. | H04M 1/0237 |
| | | | | | 361/679.01 |

(Continued)

FOREIGN PATENT DOCUMENTS

| | | |
|---|---|---|
| CN | 106131251 A | 11/2016 |
| CN | 111243440 A | 6/2020 |

(Continued)

*Primary Examiner* — Rockshana D Chowdhury
(74) *Attorney, Agent, or Firm* — Price Heneveld LLP

(57) ABSTRACT

An electronic device includes: a housing, where the housing is provided with a first surface and a second surface that are back away from each other; a flexible display, where the flexible display is disposed on the housing, and the flexible display includes a first portion; and a driving mechanism, where the driving mechanism is disposed in the housing, the driving mechanism is connected to the flexible display, and the driving mechanism drives the flexible display to slide between a first position and a second position. In a case that the flexible display is located at the first position, the first portion is located on a side on which the first surface is located; and in a case that the flexible display is located at the second position, the flexible display is bent and the first portion slides to a side on which the second surface is located.

12 Claims, 12 Drawing Sheets

(56) References Cited

U.S. PATENT DOCUMENTS

| | | | | |
|---|---|---|---|---|
| 11,886,243 | B2 * | 1/2024 | Lee | H04M 1/022 |
| 12,101,423 | B2 * | 9/2024 | Li | G06F 1/1652 |
| 2006/0007368 | A1 | 1/2006 | Slikkerveer et al. | |
| 2013/0058063 | A1 * | 3/2013 | O'Brien | G06F 1/1624 |
| | | | | 361/807 |
| 2016/0143131 | A1 | 5/2016 | Ahn | |
| 2018/0014417 | A1 | 1/2018 | Seo et al. | |
| 2019/0371505 | A1 | 12/2019 | Lin | |
| 2020/0020255 | A1 | 1/2020 | Yoon | |
| 2020/0225711 | A1 * | 7/2020 | Pelissier | G06F 1/1624 |
| 2020/0363841 | A1 | 11/2020 | Kim et al. | |
| 2021/0044683 | A1 | 2/2021 | He et al. | |
| 2022/0148477 | A1 * | 5/2022 | Han | H04B 5/20 |
| 2022/0150613 | A1 * | 5/2022 | Cho | G01P 1/00 |
| 2022/0308633 | A1 * | 9/2022 | Yin | G06F 1/1624 |
| 2022/0311848 | A1 * | 9/2022 | Delaporte | G06F 1/1652 |
| 2022/0321748 | A1 * | 10/2022 | Lee | H04M 1/0235 |
| 2022/0350369 | A1 * | 11/2022 | Xu | G06F 1/1677 |
| 2023/0036424 | A1 * | 2/2023 | Kim | G06F 1/1616 |
| 2023/0177982 | A1 * | 6/2023 | Lee | H04N 21/431 |
| | | | | 361/679.27 |
| 2023/0259168 | A1 * | 8/2023 | Gu | H04M 1/0235 |
| 2024/0040023 | A1 * | 2/2024 | Wang | H04M 1/0237 |

FOREIGN PATENT DOCUMENTS

| | | | |
|---|---|---|---|
| CN | 111508374 A | 8/2020 | |
| CN | 111510532 A | 8/2020 | |
| CN | 111654565 A | 9/2020 | |
| CN | 111669455 A | 9/2020 | |
| CN | 112291954 A | 1/2021 | |
| JP | 2006507543 A | 3/2006 | |
| KR | 20200117741 A | 10/2020 | |
| WO | 2019107909 A1 | 6/2019 | |
| WO | 2019153818 A1 | 8/2019 | |
| WO | 2020211948 A1 | 10/2020 | |

* cited by examiner

— 200

— 100

ELECTRONIC DEVICE WITH SLIDABLE FLEXIBLE DISPLAY

CROSS-REFERENCE TO RELATED APPLICATIONS

This application is a continuation application of PCT International Application No. PCT/CN2021/125986 filed on Oct. 25, 2021, which claims priority to Chinese Patent Application No. 202011191307.6, filed with the China National Intellectual Property Administration on Oct. 30, 2020 and entitled "ELECTRONIC DEVICE", which are incorporated in their entireties by reference herein.

TECHNICAL FIELD

This application relates to the field of communication technologies, and specifically, to an electronic device.

BACKGROUND

With the rapid development of electronic devices, the display of the electronic devices is becoming bigger, which usually leads to an increased overall size of the electronic devices, along with the problem of the electronic devices being less portable. Therefore, currently, it has become a prominent problem in the structural design of electronic devices that the large display compromises portability.

In order to meet users' needs for larger display size and good portability at the same time, currently the market sees a trend of using a foldable screen to change the aspect ratio and size of the display. However, there are generally only two options for the aspect ratio and size of the display, and such relatively fixed aspect ratio and size of the display cannot meet the needs of users in different scenarios.

SUMMARY

An embodiment of this application provides an electronic device, including:

a housing, where the housing has a first surface and a second surface that are back away from each other;

a flexible display, where the flexible display is disposed on the housing, and the flexible display includes a first portion; and a driving mechanism, where the driving mechanism is disposed in the housing, the driving mechanism is connected to the flexible display, and the driving mechanism drives the flexible display to slide between a first position and a second position, where in a case that the flexible display is located at the first position, the first portion is located on a side on which the first surface is located; and in a case that the flexible display is located at the second position, the flexible display is bent and the first portion slides to a side on which the second surface is located.

Figure 1:
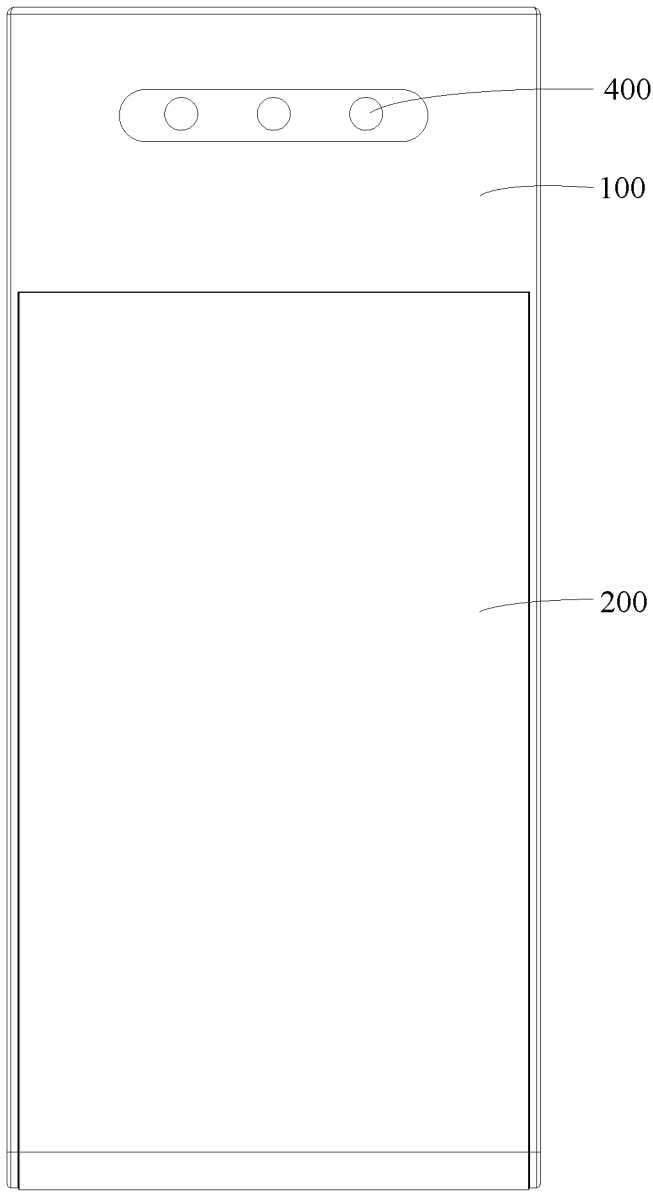
FIGS. 1 to 3 are schematic structural diagrams of a flexible display of an electronic device located at a first position from different viewing angles according to an embodiment of this application.

Reference numerals in the accompanying drawings described as follows:

100. housing, 110. first surface, 120. second surface, 130. rotation shaft portion, 140. guide groove, 150. main board, 160. sub-board, 170. flexible circuit board;

200. flexible display, 210. display body, 220. support member, 221. rigid portion, 222. flexible portion;

300. driving mechanism, 310. driving source, 320. flexible drive strip, 330. drive assembly, 331. drive gear, 331*a*. first gear, 331*b*. second gear, 332. speed reducer; and 400. camera module.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first". "second", and the like in this specification and claims of this application are used to distinguish between similar objects rather than to describe a specific order or sequence. It should be understood that the terms used in this way is interchangeable in appropriate circumstances so that the embodiments of this application can be implemented in other orders than the order illustrated or described herein. In addition, "and/or" in the specification and claims represents at least one of connected objects, and the character "/" generally indicates that the associated objects have an "or" relationship.

With reference to the accompanying drawings, an electronic device provided in the embodiments of this application is described below in detail by using specific embodiments and application scenarios thereof.

Figure 2:
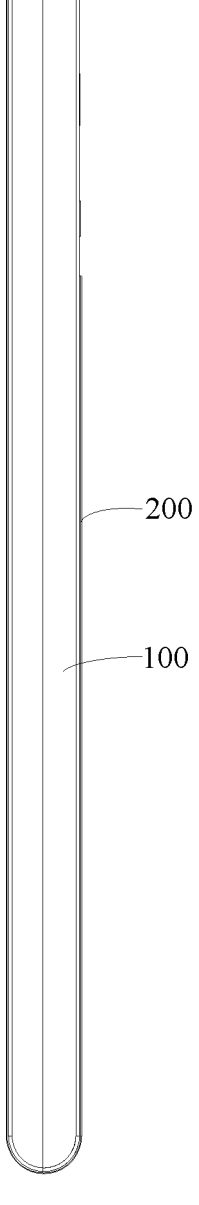
Figure 3:
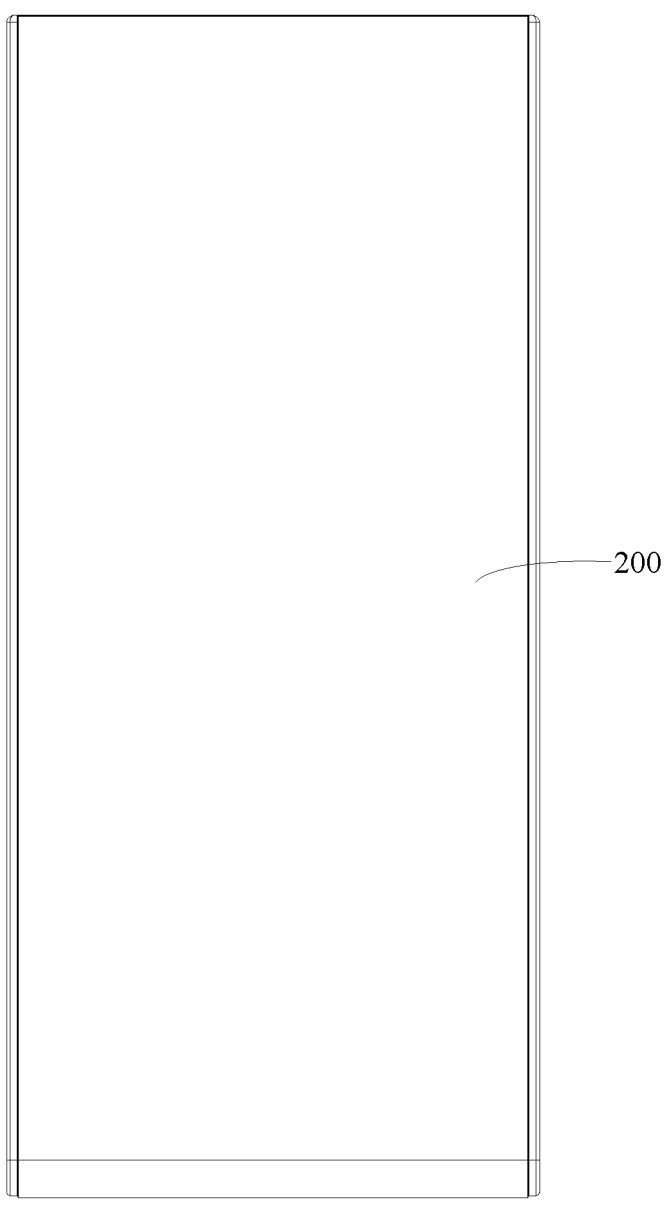
Figure 4:
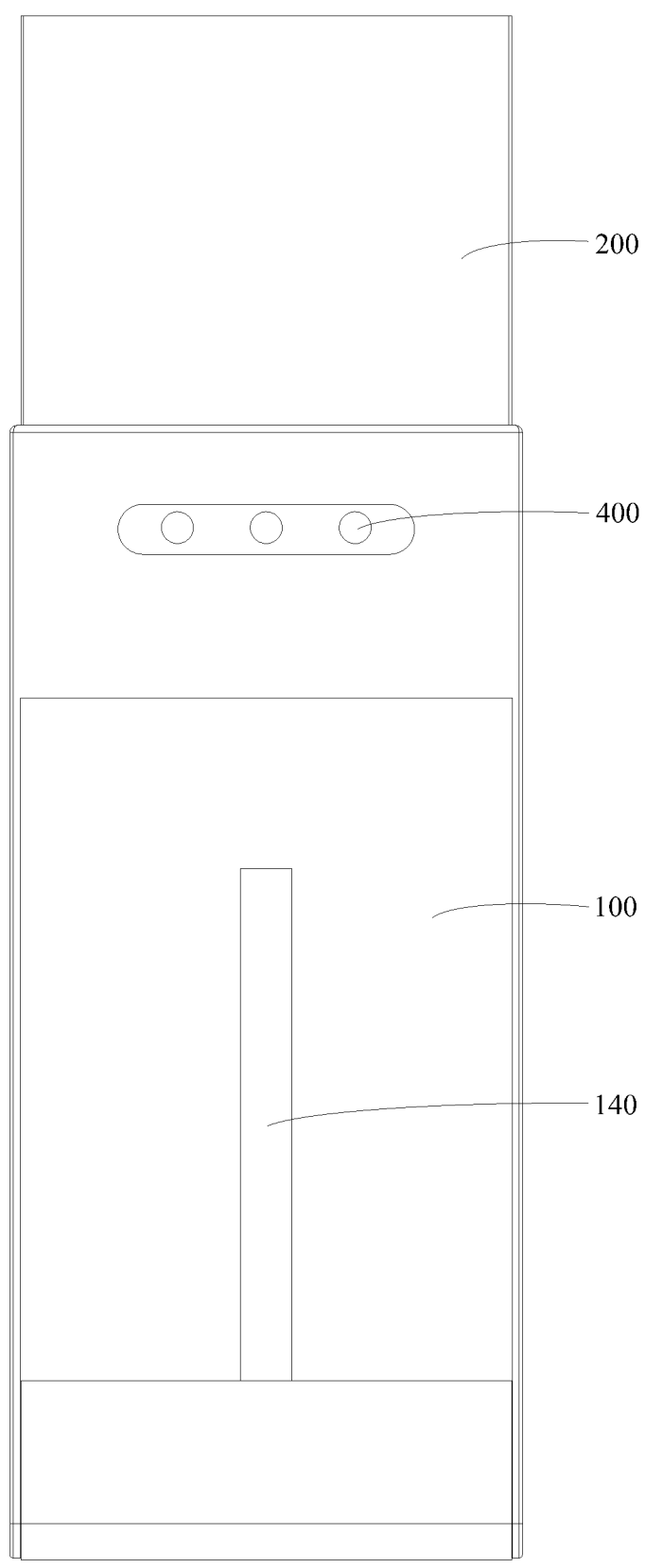
FIGS. 4 to 6 are schematic structural diagrams of a flexible display of an electronic device located at a second position from different viewing angles according to an embodiment of this application.
Figure 5:
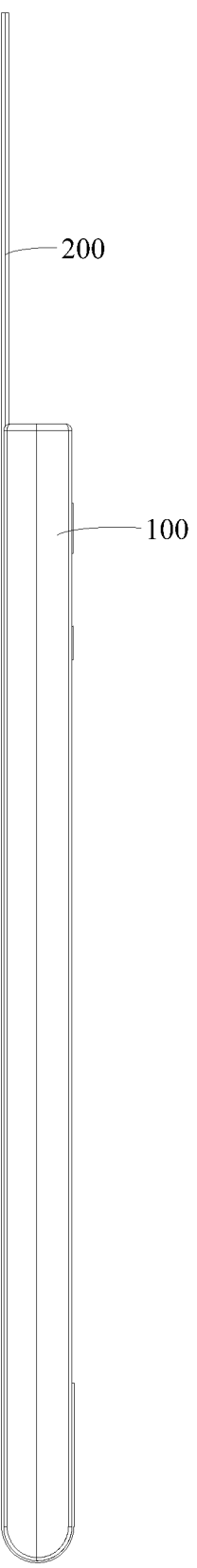
Figure 6:
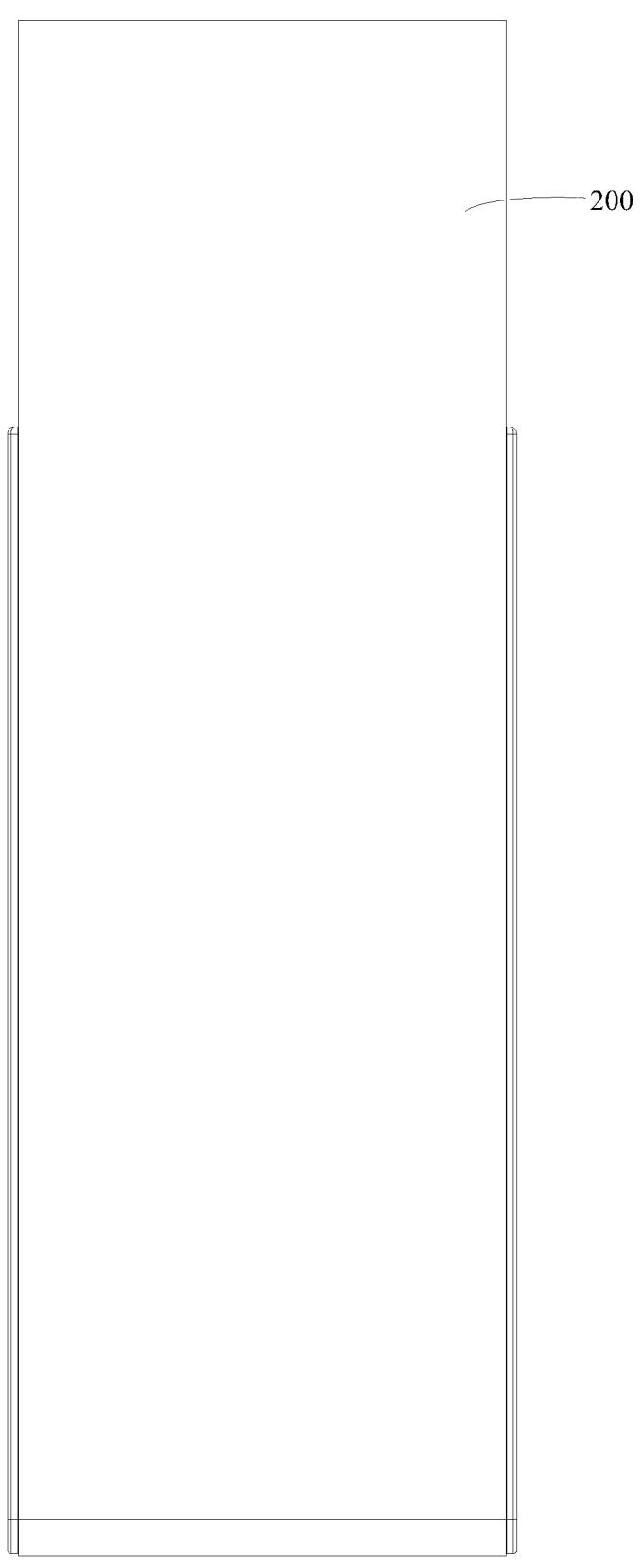
Figure 7:
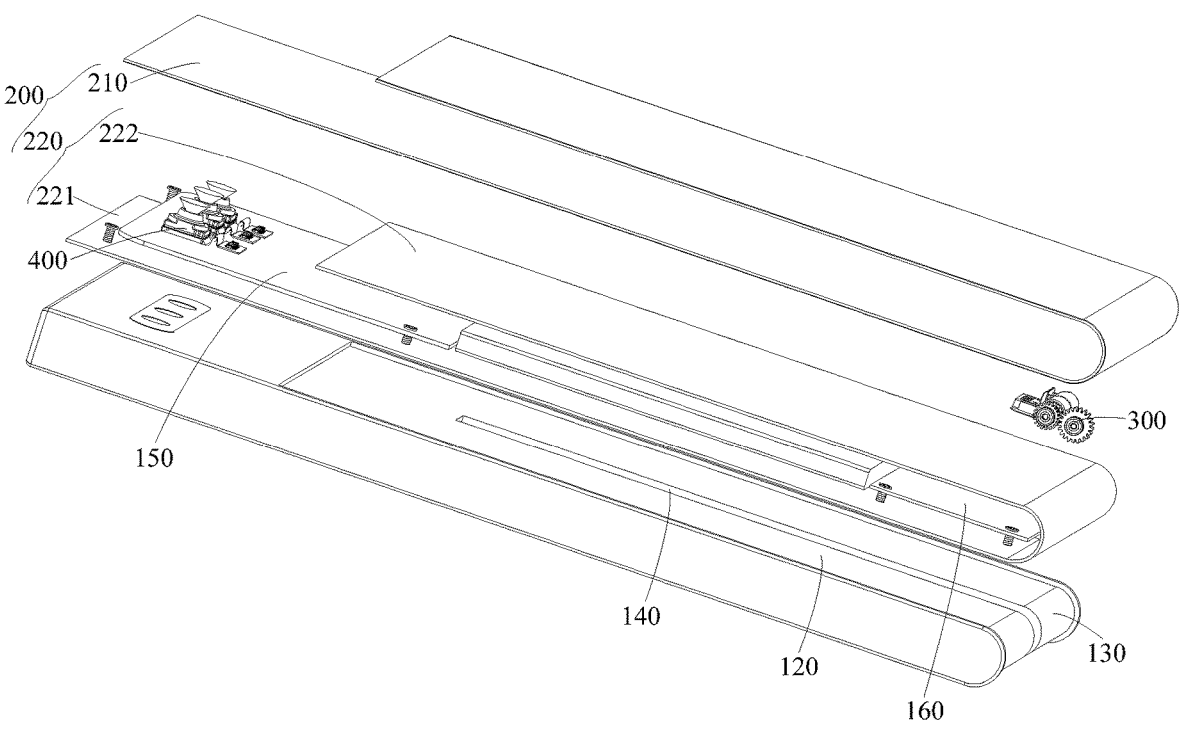
FIG. 7 is an exploded view of an electronic device according to an embodiment of this application.
Figure 8:
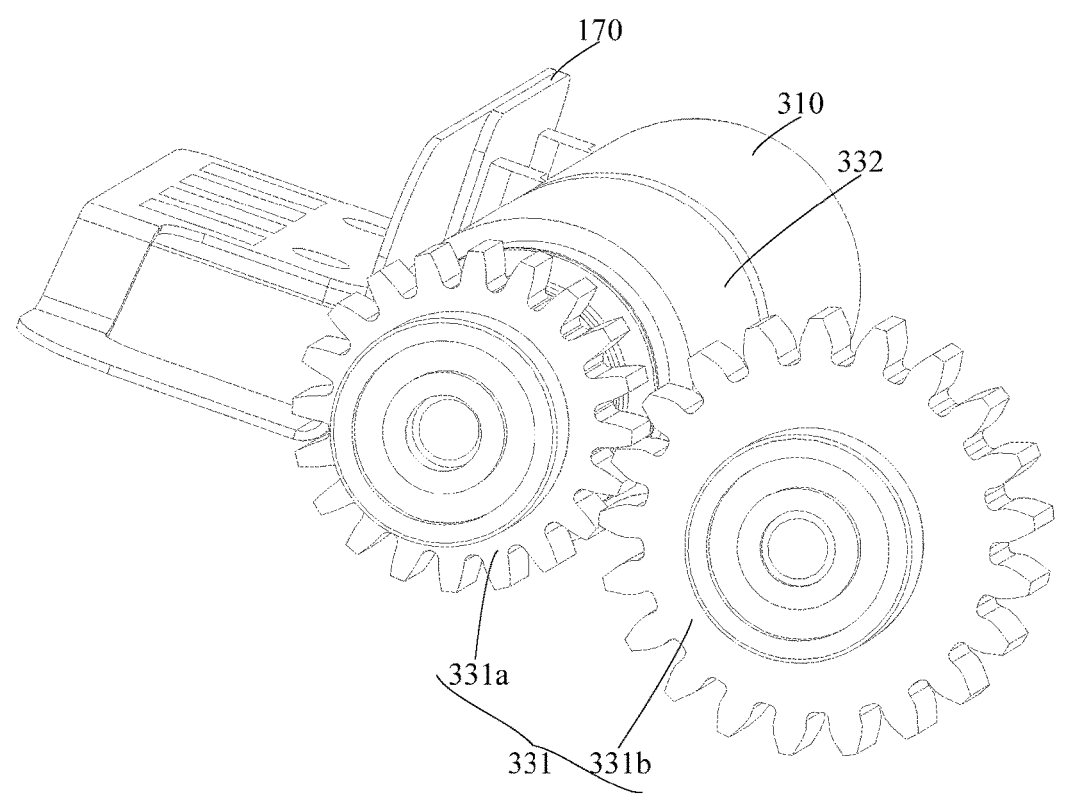
FIG. 8 is a schematic diagram of a partial structure in FIG. 7.
Figure 9:
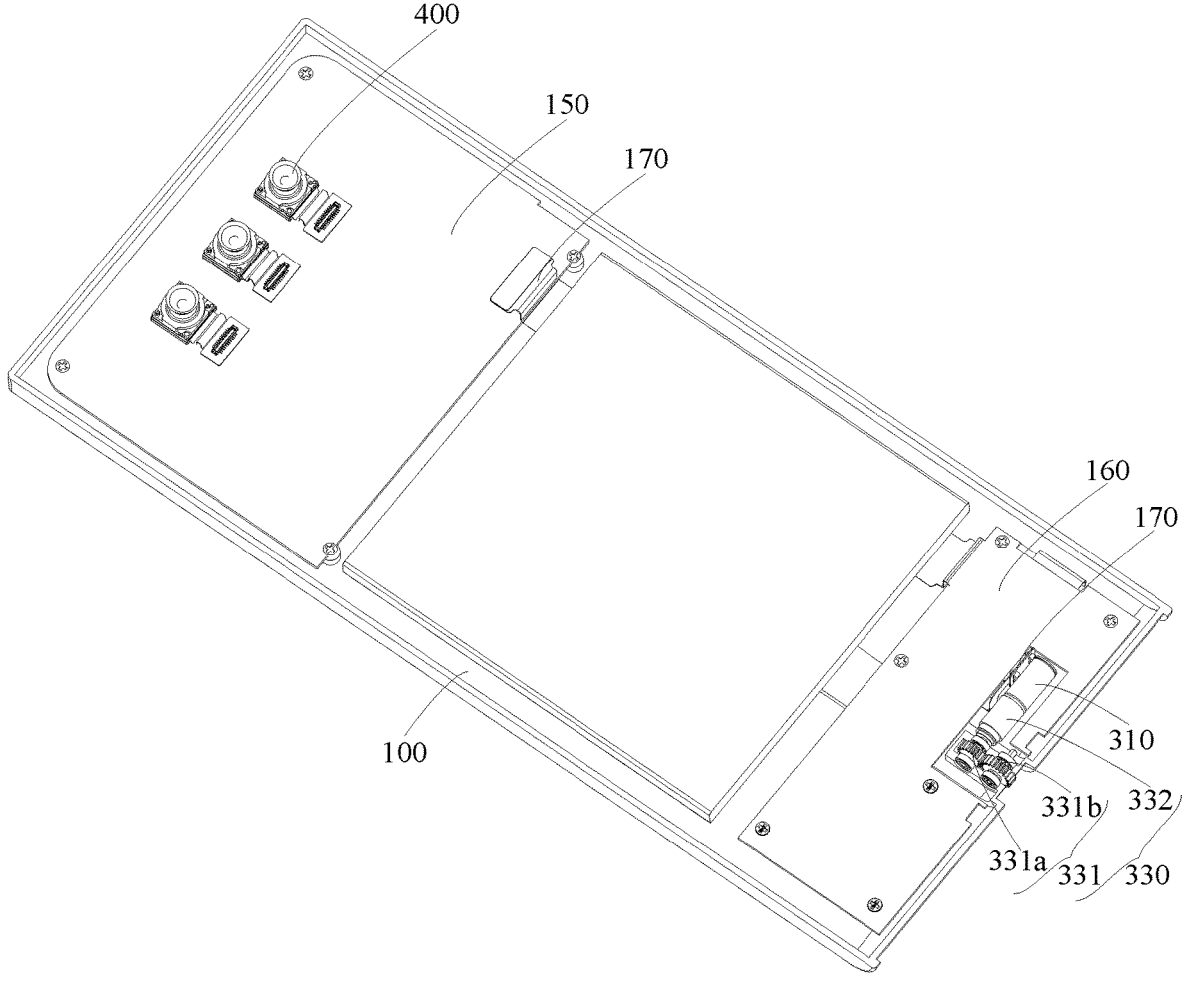
FIGS. 9 and 10 are schematic diagrams of a partial structure of an electronic device from different viewing angles according to an embodiment of this application.
Figure 10:
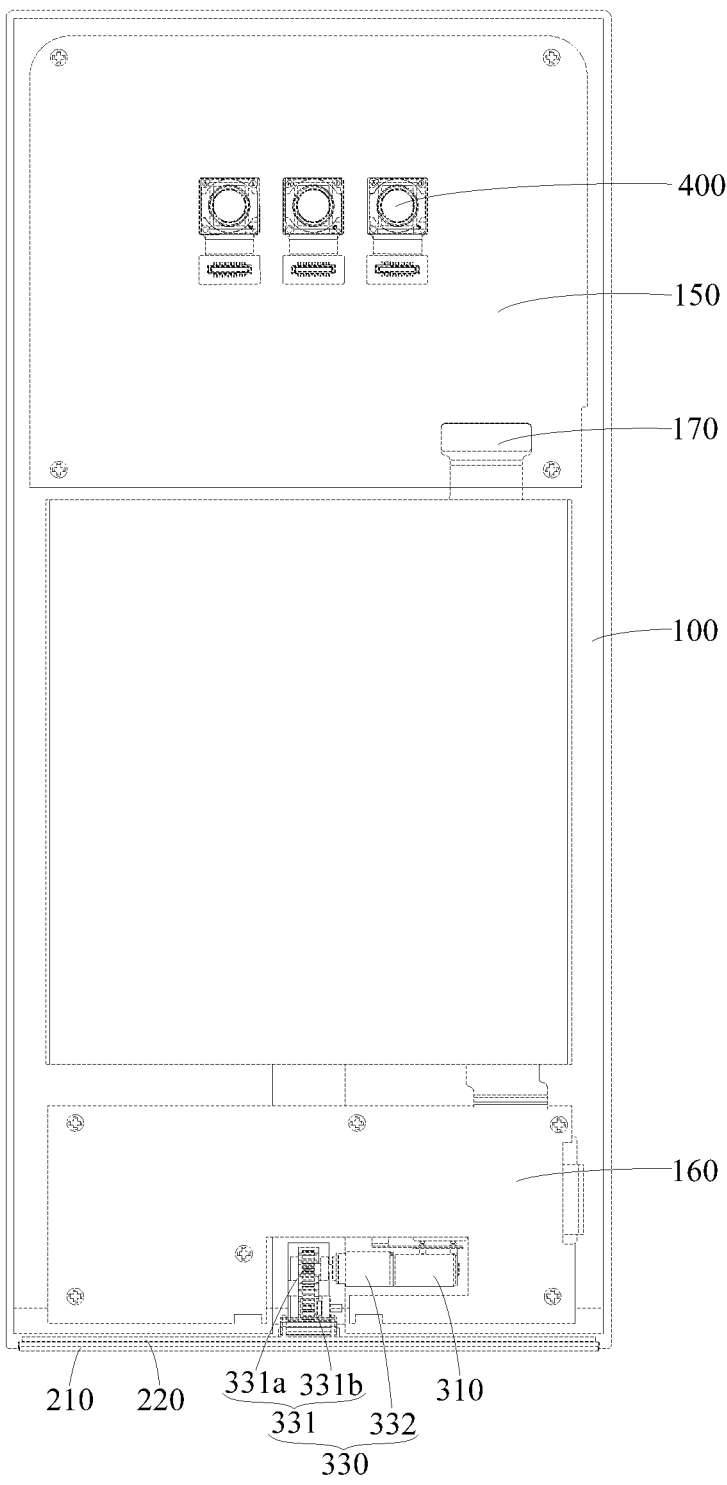
Figure 11:
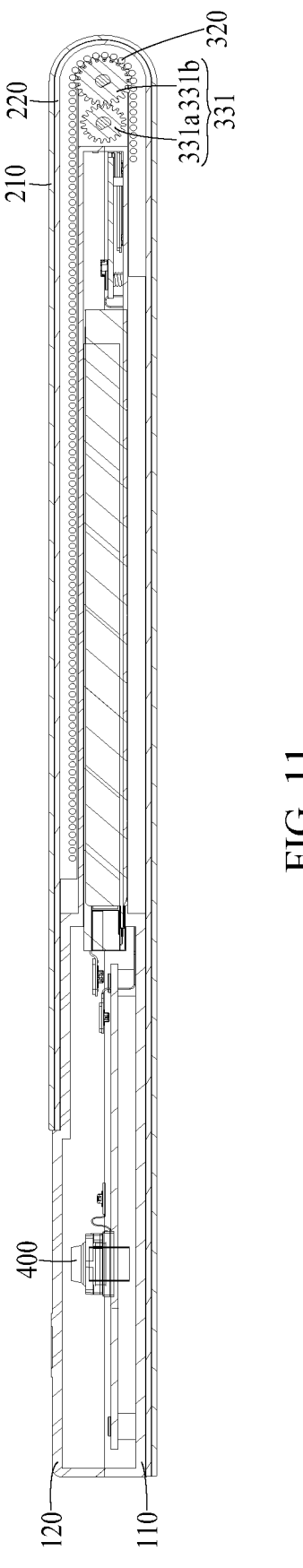
FIG. 11 is a cross-sectional diagram of a flexible display of an electronic device located at a first position according to an embodiment of this application.
Figure 12:
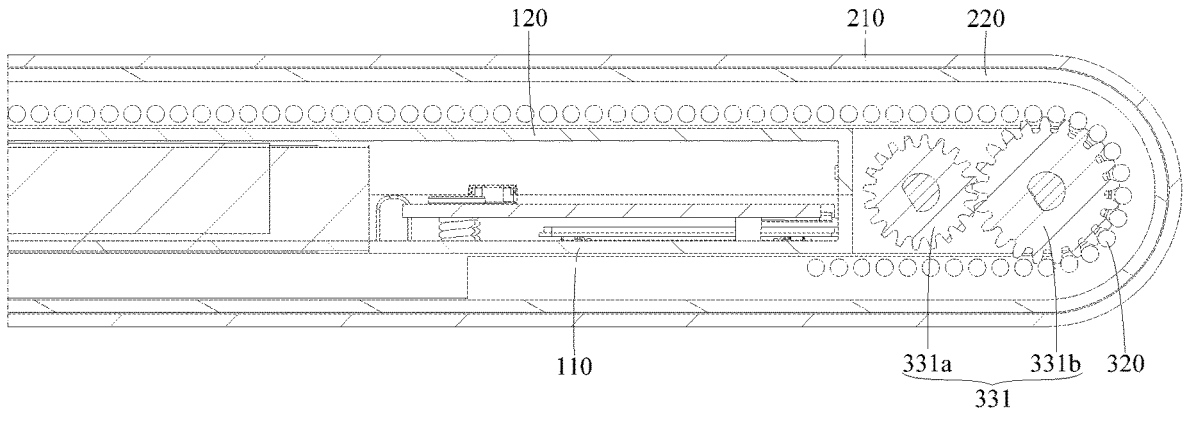
FIG. 12 is a partially enlarged view of FIG. 11.
Figure 13:
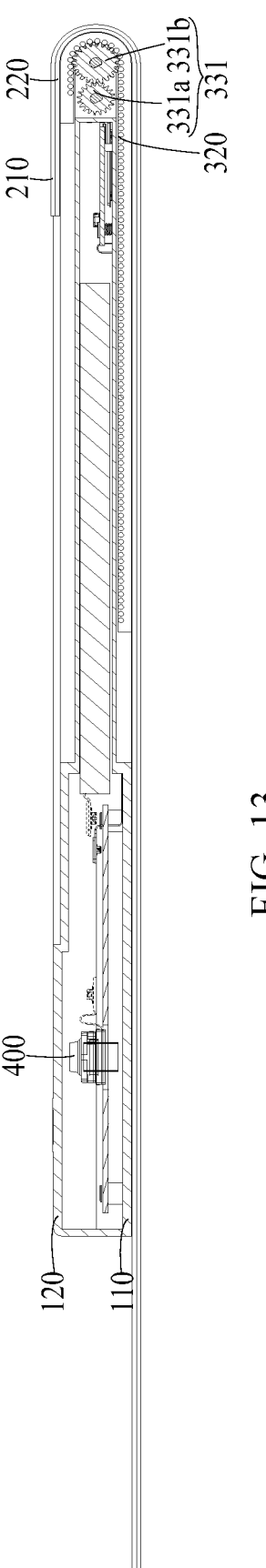
FIG. 13 is a cross-sectional diagram of a flexible display of an electronic device located at a second position according to an embodiment of this application.

Refer to FIGS. 1 to 13. An embodiment of this application discloses an electronic device including a housing 100, a flexible display 200, and a driving mechanism 300.

The housing 100 is a basic component of the electronic device. The housing 100 can provide a mounting base for other components of the electronic device. The housing 100 has a first surface 110 and a second surface 120 that are back away from each other. Optionally, the first surface 110 of the electronic device is a front surface and the second surface 120 thereof is a back surface, the front surface being taken as a main use interface of the electronic device.

The flexible display 200 is bendable. The flexible display 200 is disposed on the housing 100. The flexible display 200 includes a first portion.

The driving mechanism 300 is disposed in the housing 100. The driving mechanism 300 may include at least one of a motor, an air cylinder, and a hydraulic cylinder. The motor features small size, high efficiency and convenient control; and the air cylinder and hydraulic cylinder feature large output force and stable performance. The driving mechanism 300 is not limited to a specific manner in the embodiments of this application. The driving mechanism 300 is connected to the flexible display 200. The driving mechanism 300 drives the flexible display 200 to slide between a first position and a second position. In a case that the flexible display 200 is located at the first position, the first portion is located on a side on which the first surface 110 is located. In a case that the flexible display 200 is located at the second position, the flexible display 200 is bent, and the first portion slides to a side on which the second surface 120 is located, so that the part of the flexible display 200 located on the first surface 110 is larger in size. In this case, that part can meet the user requirement for large-screen electronic devices, thereby improving user experience. In other words, at least part of the flexible display 200 can switch the position between the side on which the first surface 110 is located and the side on which the second surface 120 is located, thereby changing the area of the part of the flexible display 200 on the same side as the first surface 110 and the area of the part on the same side as the second surface 120. Optionally, when the entire flexible display 200 has no part extending from the housing 100, the entire electronic device is relatively small and portable; when the part of the flexible display 200 on a single side of the housing 100 is enlarged, the user enjoys a better viewing experience of the content displayed on the flexible display 200.

In this embodiment of this application, the flexible display 200 is disposed on the housing 100, and the driving mechanism 300 drives, according to an instruction, the flexible display 200 to slide between the first position and the second position so that the first portion of the flexible display 200 can reach the first surface 110 of the housing 100 or can be bent to the second surface 120 of the housing 100. In this way, the parts of the flexible display 200 on the first surface 110 and second surface 120 of the housing 100 can be changed, allowing the flexible display 200 to freely change between different sizes and aspect ratios. Therefore, the electronic device disclosed in this embodiment of this application can resolve the problem of fixed aspect ratio and size of the displays of the existing electronic devices.

In an optional embodiment, the electronic device further includes a camera module 400. The camera module 400 is disposed on the top of the housing 100. The camera module 400 is mainly used to meet user's shooting needs. The bottom of the housing 100 is provided with a rotation shaft portion 130, and the bent part of the flexible display 200 is in contact with the rotation shaft portion 130. The rotation shaft portion 130 is configured to support the bent part of the flexible display 200, so as to avoid creases on the bent part of the display 200 and the resulting negative impact on user experience.

The camera module 400 may be disposed on the first surface 110 of the housing 100, that is, the camera module 400 may be disposed on the front top of the electronic device. However, such arrangement makes the main use interface of the electronic device smaller, contradicting the user requirement for a larger screen-to-body ratio. Therefore, further, in an optional embodiment, the camera module 400 is located on a side on which the second surface 120 is located, and in a case that the flexible display 200 is located at the second position, part of the flexible display 200 extends from the housing 100. Because the first surface 110 is the front surface of the electronic device, the camera module 400 being disposed on the side on which the second surface 120 is located can spare more space for the main use interface of the electronic device, such that the part of the flexible display 200 of the electronic device on the same side as the first surface 110 is larger, so as to meet the user need for large-screen electronic devices. In addition, because the camera module 400 does not occupy the main use interface of the electronic device, a plurality of camera modules 400 can be selected. The sizes and types of these camera modules 400 may be the same or different. When performing a front-facing shooting operation, a user can use the part of the flexible display 200 on the same side as the camera module 400 for viewing. When performing a rear-facing shooting operation, the user can use the part of the flexible display on the same side as the first surface 110 for viewing. Therefore, no matter whether a front-facing shooting or rear-facing shooting operation is performed, good imaging effects can be obtained through the same camera module 400 or the same group of camera modules 400.

Optionally, the rotation shaft portion 130 has a curved surface. The flexible display 200 is attached to the curved surface. In the process of the driving mechanism 300 driving the flexible display 200 to slide between the first position and the second position, because the curved surface of the rotation shaft portion 130 is attached to the flexible display 200, the sliding of the flexible display 200 can be guided, ensuring smoother sliding of the flexible display 200 without jams, thereby extending the service life of the flexible display 200. In addition, in a case that the flexible display 200 is located at the first position, the flexible display 200 being attached to the curved surface can avoid creases on the flexible display 200 and the resulting negative impact on user experience.

In an optional embodiment, the rotation shaft portion 130 is provided with an avoidance hole. Optionally, the avoidance hole may be round, square, polygonal, or of other shapes, which is not specifically limited in this embodiment of this application. One end of the driving mechanism 300 is connected to the flexible display 200 through the avoidance hole. When the driving mechanism 300 operates, the driving mechanism 300 drives the flexible display 200 to slide between the first position and the second position, featuring simple structure and easy operation.

Further, in an optional embodiment, the housing 100 has a first side surface and a second side surface that are back away from each other in a first direction, and a distance between the avoidance hole and the first side surface is equal to a distance between the avoidance hole and the second side surface, the first direction being parallel to a direction in which a bending axis of the flexible display 200 is located. Because the distance between the avoidance hole and the first side surface is equal to the distance between the avoidance hole and the second side surface, the driving force of the driving mechanism 300 on the flexible display 200 is distributed more evenly, such that the flexible display 200 does not deviate when sliding between the first position and the second position. This ensures smoother sliding of the flexible display 200 and avoids the flexible display 200 from being damaged.

In an optional embodiment, the flexible display 200 includes a display body 210 and a support member 220. The support member 220 is configured to support the display body 210. The support member 220 is slidably fitted to the housing 100, meaning that the support member 220 can slide with respect to the housing 100. The display body 210 is attached to a side of the support member 220 facing away from the driving mechanism 300. Optionally, the shape and size of the support member 220 can be consistent with those of the display body 210, so that the support member 220 provides better support for the display body 210, allowing the flexible display 200 to slide more stably with respect to the housing 100. It should be noted that the display body 210 and the support member 220 may be arranged as an integral structure or separate structures. When they are arranged as an integral structure, it is inconvenient to maintain the damaged flexible display 200. whereas arranging the display body 210 and the support member 220 as separate structures facilitates maintenance. Optionally, when the display body 210 and the support member 220 are arranged as separate structures, the display body 210 can be fastened to the support member 220 through bonding or the like, and the support member 220 drives, when sliding, the display body 210 to slide together. This makes it easy to disassemble the flexible display 200 for maintenance if the flexible display 200 is damaged.

Further, in an optional embodiment, the support member 220 includes a rigid portion 221 and a flexible portion 222. Part of the display body 210 is disposed on the rigid portion 221. and the other part thereof is disposed on the flexible portion 222. In a case that the flexible display 200 is located at the second position, the rigid portion 221 extends from the housing 100. Specifically, the driving mechanism 300 drives the support member 220 to drive the display body 210 to slide with respect to the housing 100. In this case, the display body 210 is driven by the flexible portion 222 to slide. The support member 220 is mainly used to support the display body 210, and the rigid portion 221 of the support member 220 provides stronger support than the flexible portion 222. Therefore, the rigid portion 221 of the flexible display 200 extending from the housing 100 can better support the part of the display body 210 extending from the housing 100, making that part less likely to break. In addition, the rigid portion 221 allows the user to perform more powerful touch operations in scenario such as entertainment, movie watching, or gaming while keeping the display body 200 flat, thereby providing better user experience.

In another embodiment, the support member 220 includes a first supporting portion. The first supporting portion is in a rigid state or a flexible state. In a case that the flexible display 200 is located at the first position, the first supporting portion is in the flexible state, and the first supporting portion is in contact with the housing 100, that is, the first supporting portion is disposed between the support member 220 and the housing 100. Because the first supporting portion in the flexible state is deformable, the first supporting portion can slide between a side on which the first surface 110 is located and a side on which the second surface 120 is located. In a case that the flexible display 200 is located at the second position, the first supporting portion is in the rigid state and the part of the flexible display 200 disposed on the first supporting portion extends from the housing 100. In such case, the first supporting portion is mainly used to enhance the rigidity of the support member 220 so as to allow the support member 220 to provide better support for the display body 210, making the part of the display body 210 extending from the housing 100 less likely to break.

Relatively speaking, in the embodiment in which the support member 220 includes the rigid portion 221 and the flexible portion 222, the strength at a joint between the rigid portion 221 and the flexible portion 222 is relatively low, but the rigid portion is not required to be deformable, and therefore can provide stronger support. In the embodiment in which the support member 220 includes a first supporting portion and the first supporting portion is in the rigid state or the flexible state, the first supporting portion needs to be deformable, but the entire support member 220 is free from the problem of low strength at joints of different parts.

In an optional embodiment, the driving mechanism 300 includes a driving source 310 and a flexible drive strip 320. The driving source 310 may include at least one of a motor, an air cylinder, or a hydraulic cylinder. This is not specifically limited in this embodiment of this application. The driving source 310 is connected to the flexible drive strip 320, the flexible drive strip 320 is connected to the flexible display 200, and the driving source 310 drives, using the flexible drive strip 320, the flexible display 200 to slide. Specifically, when the driving mechanism 300 receives an instruction and drives the flexible display 200 to slide between the first position and the second position, the driving source 310 drives the flexible drive strip 310 to slide, and the flexible drive strip 320 drives the flexible display 200 to slide with respect to the housing 100, so as to change the aspect ratio and size of the flexible display 200 to meet user requirements. Further, the housing 100 is provided with a guide groove 140, and the flexible drive strip 320 is slidably fitted to the guide groove 140, meaning that the flexible drive strip 320 is at least partially disposed in the guide groove 140. Under the action of the driving source 310, the flexible drive strip 320 slides and drives the flexible display 200 to slide. The guide groove 140 can guide the sliding of the flexible display 200, allowing the flexible display 200 to slide more stably. In addition, the guide groove 140 can reduce the additional space occupied by the flexible drive strip 320, which helps to reduce the thickness of the electronic device.

Still further, in an optional embodiment, the bottom of the housing 100 may be provided with an avoidance hole, and one end of the driving source 310 is connected to the flexible drive strip 320 through the avoidance hole. In this case, the avoidance hole can communicate with the guide groove 140. As compared with the method of respectively disposing the avoidance hole and the guide groove 140 at different parts of the housing 100, making the avoidance hole and the guide groove 140 in communication can reduce the amount of material removed from the housing 100, thereby improving the structural strength of the housing 100.

Optionally, the driving mechanism 300 of the electronic device disclosed in this embodiment of this application further includes a drive assembly 330. Optionally, the drive assembly 330 may operate in a plurality of manners such as gear drive, belt drive, and chain drive. This is not limited particularly in this embodiment of this application. The driving source 310 is connected to the flexible drive strip 320 through the drive assembly 330. When the aspect ratio and size of the flexible display 200 need to be adjusted, the driving mechanism 300 receives an instruction and the driving source 310 drives, through the drive assembly 330, the flexible drive strip 320 to slide. Because the drive assembly 330 has the characteristics of deceleration and distance increase, the drive assembly 330 can make the flexible drive strip 320 operate under better working conditions, thereby driving the flexible display 200 to slide more stably, and avoiding the flexible display 200 from being jammed in the sliding process. Moreover, because the flexible display 200 is disposed on the housing 100, the drive assembly 330 disposed in the housing 100 can support the flexible display 200, so that flexible display is unlikely to break in the sliding process.

Further, in an optional embodiment, the drive assembly 330 includes drive gears 331 and a drive chain meshed with the drive gears 331. The driving source 310 is connected to the drive gears 331. The drive chain is disposed on a side of the flexible drive strip 320 facing away from the flexible display 200. Specifically, when the first portion of the flexible display 200 needs to slide to the side on which the second surface 120 of the housing 100 is located, the driving source 310 drives the drive gears 331 to rotate. Because the drive gears 331 are meshed with the drive chain, the drive gears 331 drive the drive chain to move. The drive chain is disposed on a side of the flexible drive strip 320 facing away from the flexible display 200, and the flexible drive strip 320 is driven to move by the drive chain, so that the flexible display 200 slides and partially extend out of the housing 100. Therefore, in this embodiment of this application, gear drive allows for compact structure, high drive efficiency, and long service life, thereby improving the operation stability and extending service life of the flexible display 200.

Optionally, the drive assembly 330 further includes a speed reducer 332. The speed reducer 332 can change the drive ratio of the drive gears 331 and expand the change ranges of the torque and rotation speed of the drive gears 331, so as to meet the condition for the flexible display 200 to freely switch and control different sizes and aspect ratios, allowing the driving source 310 to operate under better working conditions.

Still further, in an optional embodiment, the drive gears 331 include a first gear 331a and a second gear 331b. Certainly, the first gear 331a and the second gear 331b may be each provided in a quantity of one or more. The quantities of first gears 331a and second gears 331b are not limited specifically in this embodiment of this application. The first gear 331a is disposed on an output shaft of the driving source 310, the second gear 331b is meshed with the first gear 331a, and the second gear 331b is meshed with the drive chain, the output shaft of the driving source 310 being parallel to a bending axis of the flexible display 200. Specifically, when the driving mechanism 300 drives the flexible display 200 to slide between the first position and the second position, the driving source 310 drives the first gear 331a to rotate. Because the second gear 331b is meshed with the first gear 331a, the first gear 331a drives the second gear 331b to rotate. Because the second gear 331b is meshed with the drive chain, the second gear 331b drives the drive chain to move, such that the flexible drive strip 320 drives the flexible display 200 to slide. The output shaft of the driving source 310 is parallel to the bending axis of the flexible display 200, which facilitates the arrangement of the driving source 310. The drive gears 331 include the first gear 331a and the second gear 331b, and the drive between the driving source 310 and the flexible drive strip 320 can be implemented using the small-sized gears, thereby reducing the thickness of the electronic device.

Optionally, the electronic device may further include a main board 150, a sub-board 160, and a flexible circuit board 170, all of which are fastened on the housing 100. The main board 150 is connected to the sub-board 160 through the flexible circuit board 170. When the aspect ratio and size of the flexible display 200 need to be adjusted, the main board 150 transmits the signal to the sub-board 160 through the flexible circuit board 170 after receiving an instruction. Then, the sub-board 160 transmits the signal to the driving mechanism 300 through another flexible circuit board 170, and the driving mechanism 300 drives the flexible display 200 to slide between the first position and the second position.

In an optional embodiment, the flexible drive strip 320 is shorter than the flexible display 200. Due to the limited space in the housing 100 of the electronic device, the length of the flexible drive strip 320 is only required to meet the usage requirements, and a short flexible drive strip 320 can save space. Moreover, in a case that the flexible display 200 is located at the second position, only part of the flexible display 200 slides to the side on which the second surface 120 of the housing 100 is located, and a short flexible drive strip 320 can avoid waste and reduce costs.

In an optional embodiment, at least one of the first surface 110 or the second surface 120 is provided with an accommodation groove, and the flexible display 200 is at least partially located in the accommodation groove. Because the flexible display 200 can slide with respect to the housing 100, the flexible display 200 is at least partially located in the accommodation groove in the process of the driving mechanism 300 driving the flexible display 200 to slide between the first position and the second position. This ensures that the flexible display 200 slides more stably toward the predetermined extension direction of the accommodation groove, thereby avoiding jamming. In addition, the accommodation groove can reduce the additional space occupied by the flexible display 200, which helps reduce the thickness of the electronic device.

The electronic device disclosed in this embodiment of this application may be a smartphone, a tablet computer, an e-book reader, a wearable device (for example, a smart watch), a game console, or other electronic devices. A type of the electronic device is not specifically limited in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An electronic device with slidable flexible display, comprising:
   a housing, wherein the housing has a first surface and a second surface that are back away from each other;
   a flexible display, wherein the flexible display is disposed on the housing, and the flexible display comprises a first portion; and
   a driving mechanism, wherein the driving mechanism is disposed in the housing, the driving mechanism is connected to the flexible display, and the driving mechanism drives the flexible display to slide between a first position and a second position, wherein
   in a case that the flexible display is located at the first position, the first portion is located on a side on which the first surface is located; and in a case that the flexible display is located at the second position, the flexible display is bent and the first portion slides to a side on which the second surface is located;
   wherein the driving mechanism comprises a driving source and a flexible drive strip, wherein the driving source is connected to the flexible drive strip, the flexible drive strip is connected to the flexible display, and the driving source drives, using the flexible drive strip, the flexible display to slide; and the housing is provided with a guide groove, wherein the flexible drive strip is slidably fitted to the guide groove;

wherein the electronic device further comprises a camera module, wherein the camera module is disposed at the top of the housing, the bottom of the housing is provided with a rotation shaft portion, and a bent part of the flexible display is in contact with the rotation shaft portion;

wherein the rotation shaft portion is provided with an avoidance hole, and one end of the driving mechanism is connected to the flexible display through the avoidance hole.

2. The electronic device according to claim 1, wherein the flexible display comprises a display body and a support member, wherein the support member is slidably fitted to the housing, and the display body is attached to a side of the support member facing away from the driving mechanism.

3. The electronic device according to claim 2, wherein the support member comprises a rigid portion and a flexible portion, part of the display body is disposed on the rigid portion, and the other part thereof is disposed on the flexible portion; and in a case that the flexible display is located at the second position, the rigid portion extends from the housing.

4. The electronic device according to claim 2, wherein the support member comprises a first supporting portion, and the first supporting portion is in a rigid state or a flexible state, wherein in a case that the flexible display is located at the first position, the first supporting portion is in the flexible state, and the first supporting portion is in contact with the housing; and in a case that the flexible display is located at the second position, the first supporting portion is in the rigid state and part of the flexible display disposed in the first supporting portion extends from the housing.

5. The electronic device according to claim 1, wherein the driving mechanism further comprises a drive assembly, and the driving source is connected to the flexible drive strip through the drive assembly.

6. The electronic device according to claim 5, wherein the drive assembly comprises drive gears and a drive chain meshed with the drive gears, the driving source is connected to the drive gears, and the drive chain is disposed on a side of the flexible drive strip facing away from the flexible display.

7. The electronic device according to claim 6, wherein the drive gears comprise a first gear and a second gear, the first gear is disposed on an output shaft of the driving source, the second gear is meshed with the first gear, and the second gear is meshed with the drive chain, the output shaft of the driving source being parallel to a bending axis of the flexible display.

8. The electronic device according to claim 1, wherein the flexible drive strip is shorter than the flexible display.

9. The electronic device according to claim 1, wherein the camera module is located on the side on which the second surface is located, and in a case that the flexible display is located at the second position, part of the flexible display extends from the housing.

10. The electronic device according to claim 1, wherein the rotation shaft portion has a curved surface, and the flexible display is attached to the curved surface.

11. The electronic device according to claim 1, wherein the housing has a first side surface and a second side surface that are back away from each other in a first direction, and a distance between the avoidance hole and the first side surface is equal to a distance between the avoidance hole and the second side surface, wherein the first direction is parallel to a direction in which a bending axis of the flexible display is located.

12. The electronic device according to claim 1, wherein at least one of the first surface and the second surface is provided with an accommodation groove, and at least part of the flexible display is located in the accommodation groove.

* * * * *